US006425211B1

(12) United States Patent
Wise et al.

(10) Patent No.: US 6,425,211 B1
(45) Date of Patent: Jul. 30, 2002

(54) SELF-CLOSING FIRE RATED FLOOR DOOR

(75) Inventors: David R. Wise, Burnaby (CA); Alfred G. Craig, Cicero; Jerome E. Beck, Syracuse, both of NY (US)

(73) Assignee: Maxam Metal Products Ltd., Burnaby (CA)

( * ) Notice: Subject to any disclaimer, the term of this patent is extended or adjusted under 35 U.S.C. 154(b) by 0 days.

(21) Appl. No.: 09/715,114

(22) Filed: Nov. 20, 2000

(51) Int. Cl.[7] .................................................. B32B 9/00

(52) U.S. Cl. ............................. 52/1; 428/457; 428/209; 49/1; 49/5

(58) Field of Search ................................ 428/457, 209; 52/1; 49/279, 3, 1, 5, 7, 141, 356

(56) References Cited

U.S. PATENT DOCUMENTS 2,361,040 A * 10/1944 Larsen ........................ 268/64
2,490,823 A * 12/1949 Manning ....................... 60/51
2,618,365 A * 11/1952 Seagren ....................... 188/96
3,589,065 A 6/1971 Watson
4,043,128 A 8/1977 Bendler et al.
4,081,964 A * 4/1978 Bendler et al. ............... 60/636
4,104,834 A * 8/1978 Anghinetti et al. .............. 52/1
4,313,453 A * 2/1982 Holmes ....................... 137/74
5,554,433 A 9/1996 Perrone, Jr. et al.
5,565,274 A * 10/1996 Perrone, Jr. et al. ........ 428/457

* cited by examiner

*Primary Examiner*—Carl D. Friedman
*Assistant Examiner*—Basil Katcheves
(74) *Attorney, Agent, or Firm*—Oyen Wiggs Green & Mutala

(57) ABSTRACT

This invention relates to a novel self-closing fire rated floor door. More particularly, this invention pertains to a novel floor door which uses fusible plugs and compressed gas cylinders for automatically closing the floor door when ambient temperature rises above a predetermined temperature, due to a fire. A self-closing fire rated floor door assembly comprising: (a) a fire rated frame with an opening therethrough; (b) a fire rated door hingedly connected to the frame and cooperating with the opening; (c) a fluid cylinder which is pivotally connected to the frame and the door, the cylinder when pressurized with fluid opening the door relative to the frame, and when depressurized, closing the door relative to the frame; (d) a fusible plug, rated according to a specific temperature, connected in fluid-tight manner with the fluid cylinder.

11 Claims, 7 Drawing Sheets

SELF-CLOSING FIRE RATED FLOOR DOOR

TECHNICAL FIELD

This invention relates to a novel self-closing fire rated floor door. More particularly, this invention pertains to a novel floor door which uses one or more fusible plugs and one or more compressed gas cylinders for automatically closing the floor door when ambient temperature rises above a predetermined temperature, due to a fire.

BACKGROUND

Building codes and regulations passed by regulatory authorities require that multi-floor buildings, such as hotels, office towers and the like, meet stringent fire ratings. Such codes and regulations require that the multi-floor structures use fire resistant materials such as fire proof panels, and other structural elements so that they stop or inhibit the spread of fire if a fire occurs. Doors, walls, floors, ceilings, and the like, in such buildings must be constructed to pass specific fire ratings, thereby enhancing the overall safety of the multi-story building structures.

In many multi-story buildings, devices described as floor doors are installed on each floor, or on some floors, and are used to enable one or more persons to access crawl spaces or gain access through fire rated floors, or pass equipment from one floor to another. Normally, such floor doors are in a closed position but sometimes they are in an open position. If a fire breaks out, and the floor door is open, it is necessary that the door be closed to prevent the transport of fire and smoke from one floor to another floor. A number of techniques have been developed over the years for causing doors, vents and floor doors to automatically close when fire conditions are encountered.

Two U.S. patents, namely, U.S. Pat. No. 5,565,274, granted Oct. 15, 1996, and U.S. Pat. No. 5,554,433, granted Sep. 10, 1996, Perrone, Jr., et al., disclose horizontally hinged covers for use in ceiling/floors. The covers are said to be highly fire resistant and in the event of fire automatically close. The door as disclosed preferably utilizes a multilayer construction comprising an intumescent lower (inner) layer, an intermediate structural layer and a top (outer) layer of a cementitious material. The horizontally hinged door utilizes an automatic closing system in the event of fire comprising a fusible link which activates a pressurized gas source to close the door. The pressurized gas source is automatically purged when the door is closed to prevent explosion of the pressurized gas source. The fusible link also actuates (opens) a hydraulic valve to allow the flow of hydraulic fluid from a pneumatic/hydraulic housing which is used with a movable rod to open and close the door.

U.S. Pat. No. 3,589,065, granted Jun. 29, 1971, Watson, discloses a fire vent hatch which has a housing with upstanding sidewalls and a cover pivotally secured to one of the sidewalls. A pair of rams are mounted on the housing to raise the cover, the rams being connected to a sealed container containing gas under pressure. The lower end of the rams are each pivotally connected to an arm which in turn is pivotally connected to the housing, the arms swinging downwardly when the rams are actuated. A restrictor is provided to throttle the flow of gas to the cover. A scissor latch is provided for holding the cover in the closed position. Thermally and manually controlled means are provided to release the gas to the rams and to open the latch. Temperature controlled means are provided to control the release of the fluid and the release of a scissor latch. This latter means has a spring which is restrained by the use of a fusible link and release mechanism which can be actuated manually if desired.

U.S. Pat. No. 4,043,128, granted Aug. 23, 1977, Bendler, et al., discloses a door apparatus for fire protection purposes including a compressed-gas cartridge device and a thermally responsive triggering mechanism. The triggering mechanism includes a striker which is forcibly driven toward the compressed-gas cartridge device and a locking device for maintaining the striker at a specified distance from the compressed-gas cartridge device. Another end portion of the locking device is biased against a blocking device with the blocking device being disposed between the other end portion of the locking device and an abutment member. The blocking device is set to respond to temperatures above a predetermined temperature. This enables displacement of the locking device and the striker thereby moves toward the compressed-gas cartridge device, thereby closing the door.

SUMMARY OF INVENTION

The invention is directed to a self-closing fire rated floor door assembly comprising: (a) a fire rated frame with an opening therethrough; (b) a fire rated door hingedly connected to the frame and cooperating with the opening; (c) a fluid cylinder which is pivotally connected to the frame and the door, the cylinder when pressurized with fluid opening the door relative to the frame, and when depressurized, closing the door relative to the frame; (d) a fusible plug, rated according to a specific temperature, connected in fluid-tight manner with the fluid cylinder.

The assembly can include a pair of cylinders, which can be gas cylinders, the first gas cylinder being located on one side of the frame and the second gas cylinder being located on an opposite side of the frame. The pair of gas cylinders can be connected to the fusible plug by a gas-tight gas line.

The assembly can include a second fusible plug connected to a pair of gas cylinders, the first fusible plug being located at one side of the frame, and the second fusible plug being located at an opposite side of the frame. The pair of fusible plugs can be connected to the pair of gas cylinders by a series of gas-tight tubes, and a gas distribution manifold.

The fusible plug can be constructed of a hollow, elongated tube, with a gas fitting at one end adapted to engage with a gas tube, and a solder plug located in the interior of the tube at the end opposite the gas fitting, the solder being engineered to melt at a specified temperature.

The cylinder at one end can be connected to a cylinder manifold which can be pivotally mounted in a bracket secured to the frame, the cylinder manifold having formed therein a first opening which can receive an aircraft needle valve and a second opening which can receive a bleed connector valve. The cylinder manifold can have an O-ring in the interior thereof, and at one end an extension for receiving a bolt which can connect pivotally to a bracket secured to the frame. In some cases, for large doors, two or more cylinders, and two or more fusible plugs can be used.

BRIEF DESCRIPTION OF DRAWINGS

In drawings which illustrate specific embodiments of the invention, but which should not be construed as restricting the spirit or scope of the invention in any way:

FIG. 3(*b*) illustrates a section view taken along section line A—A of FIG. 3(*a*).

DETAILED DESCRIPTION OF SPECIFIC EMBODIMENTS OF THE INVENTION

Figure 1:
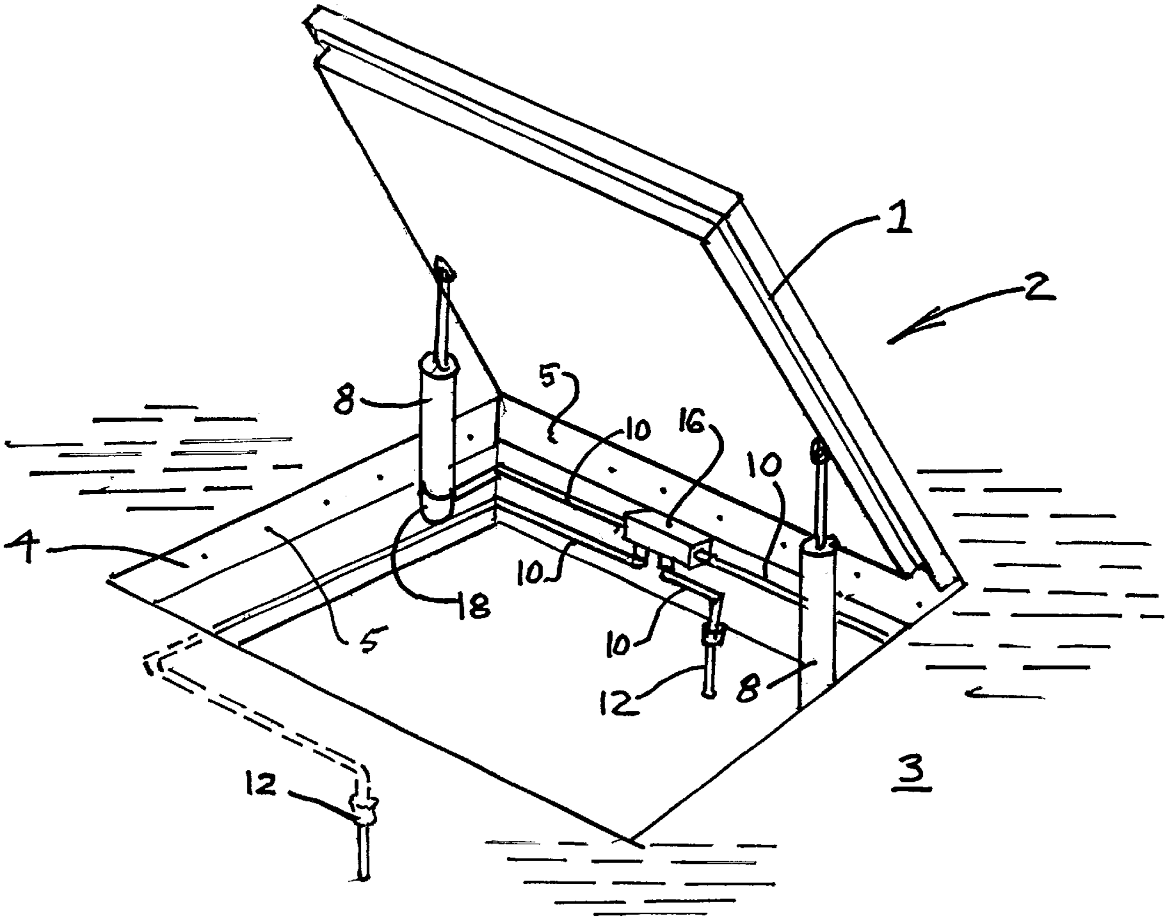
FIG. 1 illustrates a perspective view of the floor door assembly according to the invention, installed in a floor, with the door in an open position.

Referring to the drawings, FIG. 1 illustrates a perspective view of the floor door assembly installed in a floor, with the door in an open position, according to the invention. As seen in FIG. 1, the floor door 2 according to the invention comprises a fire rated floor door 1, which is shown in raised position. The overall floor door opening and closing assembly 2 comprises a rectangular frame 4, which is secured by mounting screws 5 into the fire rated floor 3 of a multi-story building. The frame 4 can also be cast into concrete floors using anchor straps. The door 1 is fire rated according standards of Intertek Testing Services NA Ltd./Warnock Hersey. The floor door according to the invention, as the case may be, passes a one to four hour fire rating when exposed to the time/temperature curve required by CAN/ULC S101-M89, ASTM E-119 and NFPA 251, *Standard for Fire Tests of Building Construction and Materials*. The floor door according to the invention also complies with NFPA 252, *Standard for Fire Tests of Door Assemblies.*

As shown in FIG. 1, the door 1, in a preferred embodiment, is raised by a pair of nitrogen cylinders 8. The cylinders 8 are supplied by stainless steel gas impermeable gas lines 10. A pair of elongated fusible plugs 12 are located in a vertical position at opposite ends of two sides of the floor door assembly 2 and connect to the pair of cylinders 8 through gas lines 10 and a central gas distribution manifold 16. The construction of the fusible plugs 12 and the cylinder manifolds 18 at the base of each cylinder 8 are discussed in more detail below in association with FIGS. 6 to 12. It is advantageous to have two fusible plugs 12 to ensure that any elevation in temperature due to fire is rapidly detected. It is understood that in certain cases, particularly where the door is large, for example, 60 ins. by 60 ins., there may be as many as four cylinders located on two sides, and four fusible plugs located on the four sides of the door opening. The number of cylinders used is based upon how many cylinders are required to handle the weight of the door and make it operate easily.

Figure 2:
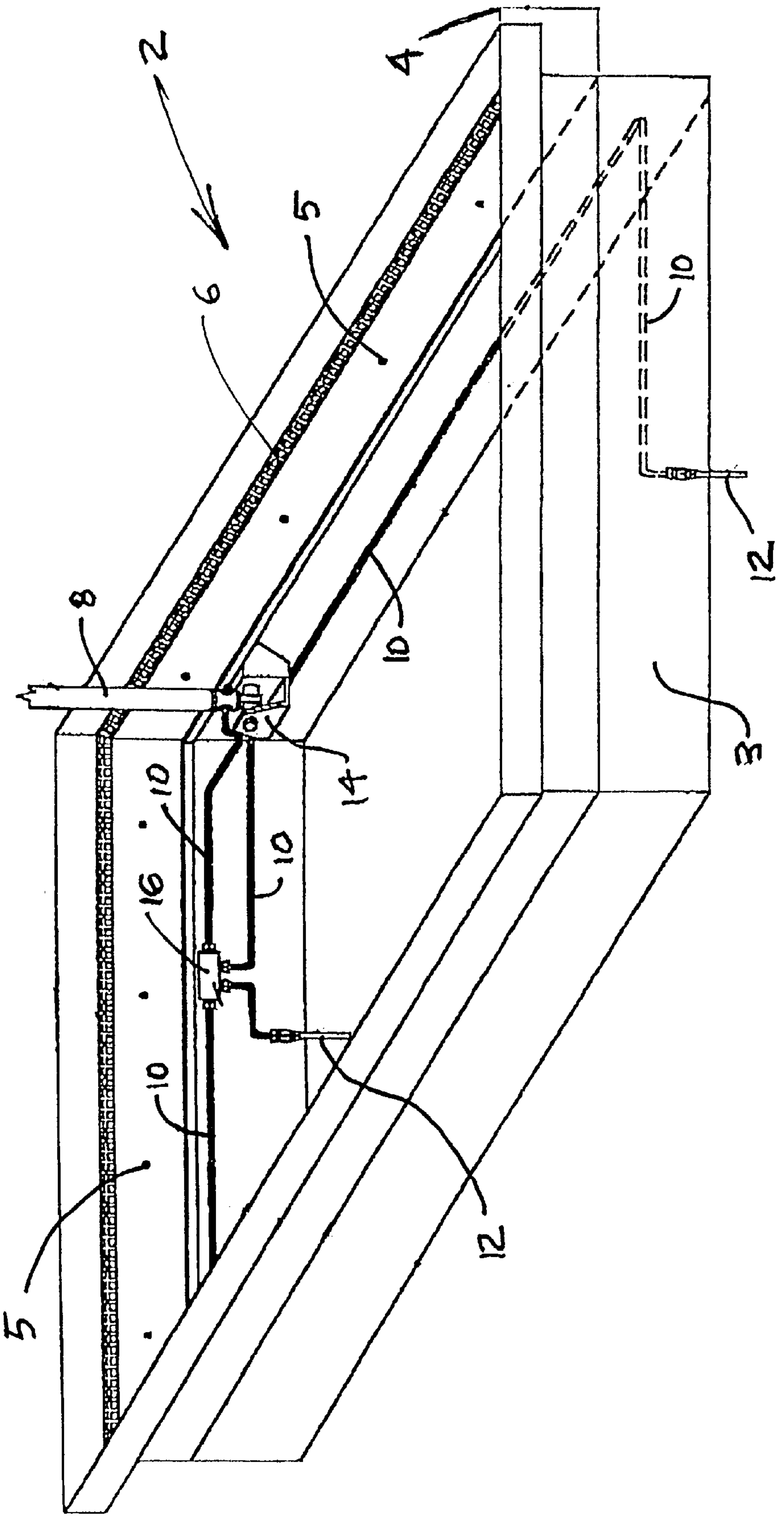
FIG. 2 illustrates an isometric view of the basic floor door assembly, without the door, according to the invention.

FIG. 2, which illustrates an isometric view of the floor door assembly, without the door, according to the invention, shows only one gas cylinder 8, which may be suitable for certain situations. However, it is to be understood that in many situations, two gas cylinders 8 will be used, as shown in FIG. 1. In other situation, three or four cylinders may be used. The floor door assembly 2 as illustrated in FIG. 2 is constructed of a rectangular metal frame 4, with a premium grade fibreglass gasket 6 mounted around the interior periphery of the frame 4 for sealing. The metal frame 4 is dropped into a wood frame or cast in a concrete floor and is joined to ⅝ drywall 3 and is secured to the floor by screws 5. The pair of vertical fusible plugs 12 are connected by gas lines 10 to the central distribution manifold 16. The floor door assembly 2, when installed, is pressured with nitrogen gas, or some other suitable inert gas such as carbon dioxide, so that the pair of fusible plugs 12, the gas lines 10, and the cylinders 8 are under equal gas pressure. When pressurized, the pair of cylinders 8 (see FIG. 1) are in extended configuration and accordingly the door 1 is in raised position. FIG. 2 also illustrates the bracket 14 which enables the cylinder to be pivotally connected to the frame 4.

Figure 3A:
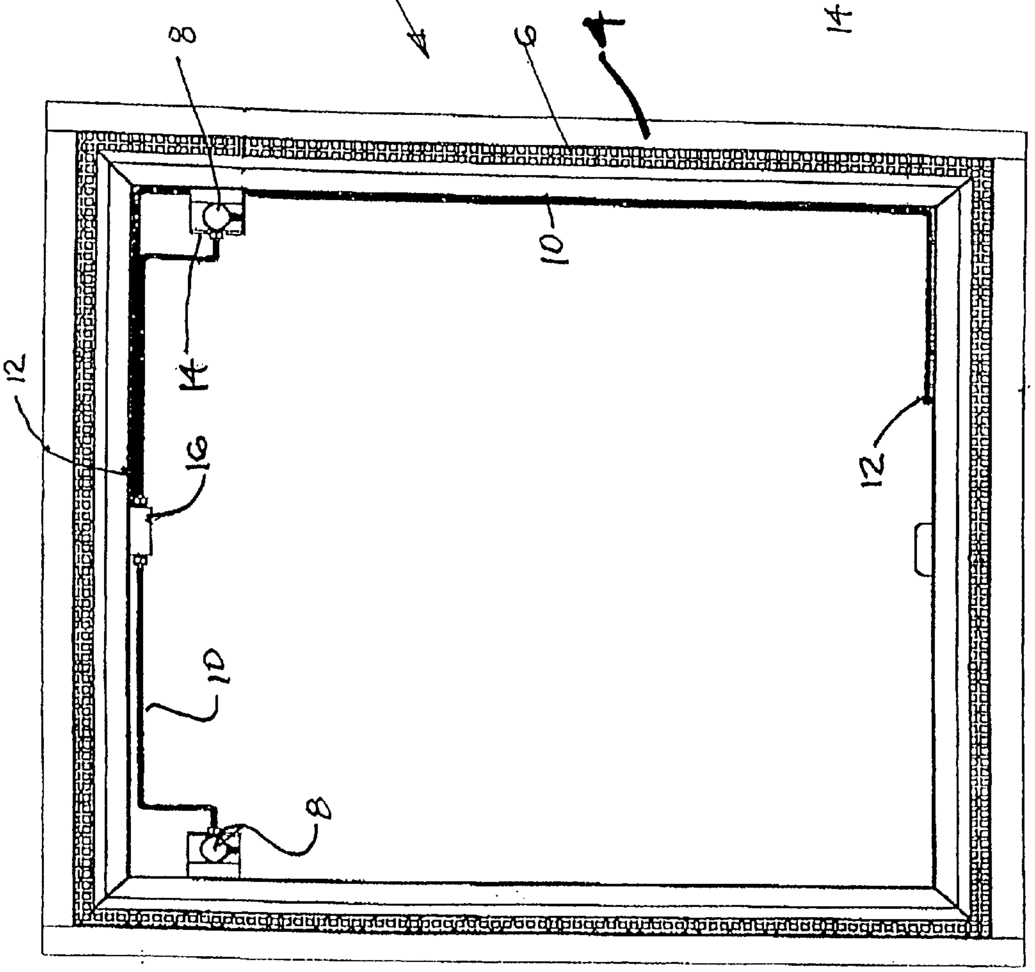
FIG. 3(*a*) illustrates a plan view of the floor door assembly according to the invention.
Figure 3B:
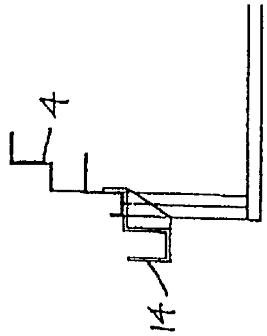

FIG. 3(*a*) illustrates a plan view of the floor door assembly 2 according to the invention, without the floor door 1. As seen in FIG. 3(*a*), the central gas distribution manifold 16 is mounted on one side of the rectangular floor door assembly 2. A ceramic tadpole woven fiberglass tape 9 is affixed around the interior of the opening. This is required on large floor doors or doors with high fire ratings. Gas lines 10 extend from the manifold 16 and connect the pair of fusible plugs 12, located at opposite sides of the floor door assembly 2, with the pair of cylinders 8, located at opposite sides of the rectangular floor door assembly 2. The base of each cylinder 8, which is a cylinder manifold 18 as shown in FIGS. 7 to 12, is mounted pivotally in a respective cylinder bracket 14 secured to the interior side wall of the frame 4.

It will be understood that in certain cases, it may be preferable to have one cylinder inverted relative to the other, or both cylinders inverted. Certain gas cylinders have internal petroleum lubricants which act to dampen the speed of travel so it may be advantageous to invert one or both cylinders to ensure proper lubrication, sealing and travel speed.

FIG. 3(*b*) illustrates a section view taken along section line A—A of FIG. 3(*a*). As seen in FIG. 3(*b*), the frame 4 is constructed to have a step-like configuration, and the cylinder bracket 14 is mounted at the base of the step-like frame 4. The step configuration of the frame 4 is advantageous because it prevents straight line connections occurring when the door 1 (not shown) is closed into the interior of the frame 4.

Figure 4:
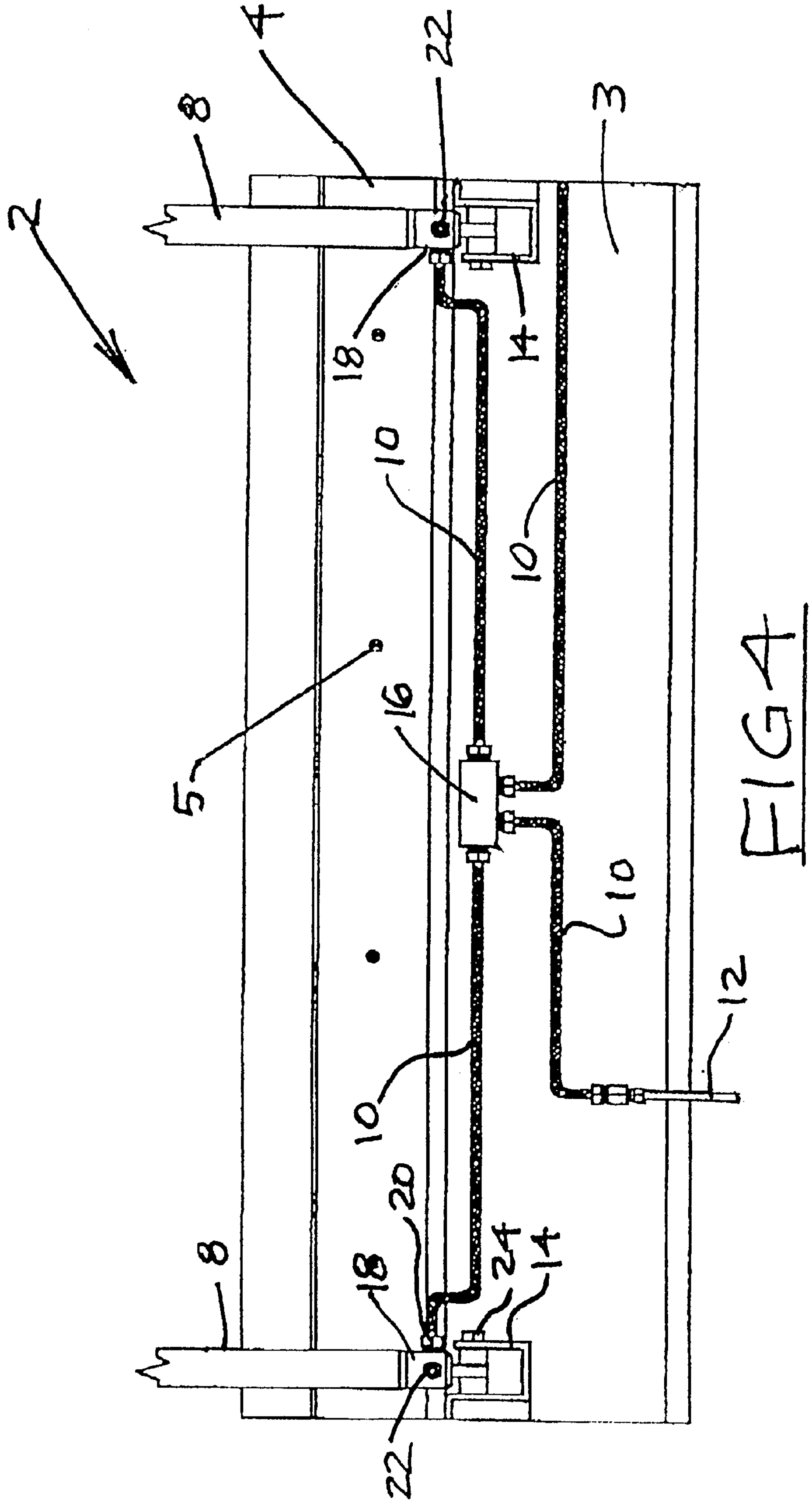
FIG. 4 illustrates a front section view of the floor door assembly according to the invention.

FIG. 4 illustrates a front section view of the floor door assembly 2 according to the invention. FIG. 4 illustrates in detail the construction of the pair of cylinder brackets 14, as well as the layout and positioning of the central gas distribution manifold 16, the four gas lines 10, the pair of cylinders 8, and one of the fusible plugs 12 (the other fusible plug 12 is not visible in FIG. 4). The cylinder bracket 14 has a generally hollow channel-like configuration. A bleed connector 22 is located in the cylinder manifold 18.

The ends of the gas line 10 opposite the distribution manifold 16 are connected to the cylinder manifolds 18 at the base of each cylinder 8 by respective aircraft needle valves 20. Thus, the gas connections meet stringent fire rating standards. Each cylinder manifold 18 also has a respective bleed connector 22, which enables gas to be either charged into or bled from the respective cylinders 8, and the gas lines 10. In some cases, it may be advisable to have only one bleed connector 22 since the entire gas system is interconnected. The full system can be pressurized through only one bleed connector 22. The cylinder manifolds 18 are pivotally mounted in the channel-like cylinder brackets 14 by pivot bolts 24. Thus, the cylinders 8 can pivot appropriately when the door 1 is opened or closed. As mentioned before, one or both of the cylinders can be inverted.

Figure 5:
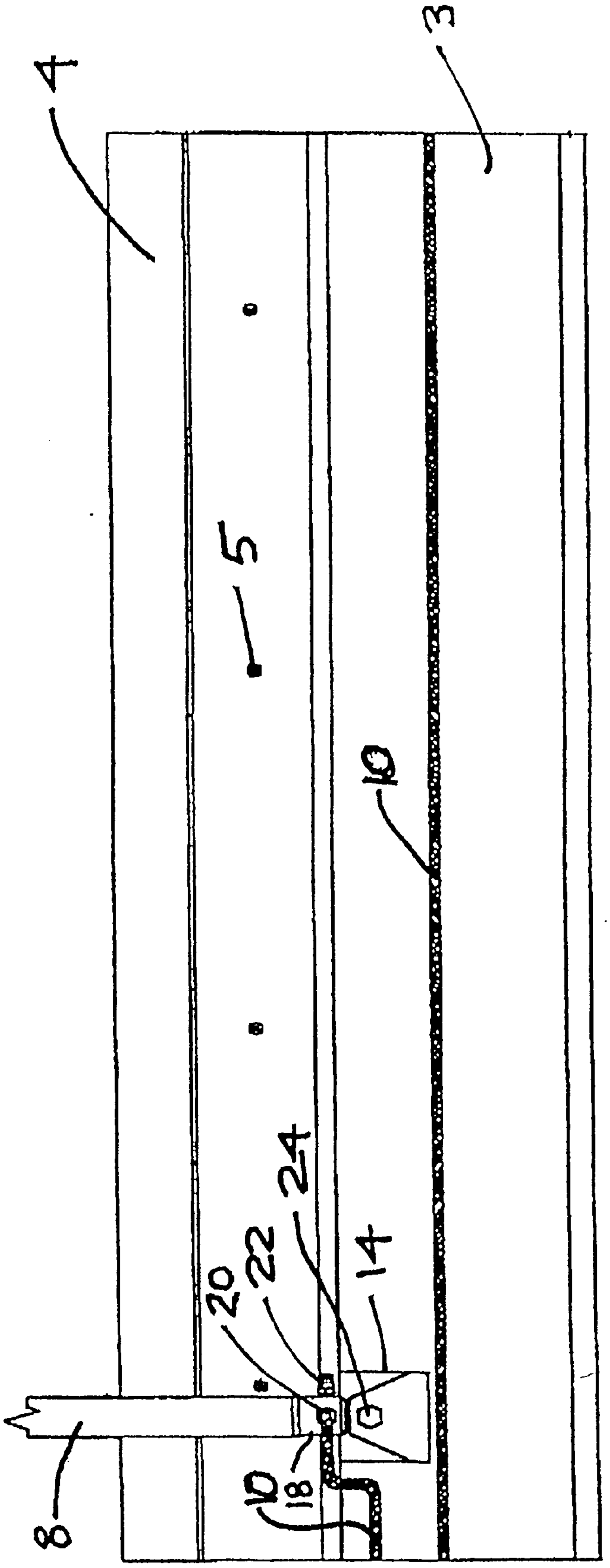
FIG. 5 illustrates a side section view of the floor door assembly according to the invention.

FIG. 5 illustrates a side section view of the floor door assembly 2 according to the invention. FIG. 5, in particular, is useful for illustrating from another direction the structure and interconnection of the components of the cylinder bracket 14, the cylinder manifold 18 at the base of the cylinder 8, the aircraft needle valve 20, and the bleed connector 22, fitted into the cylinder manifold 18 and the pivot bolt 24.

Figure 6:
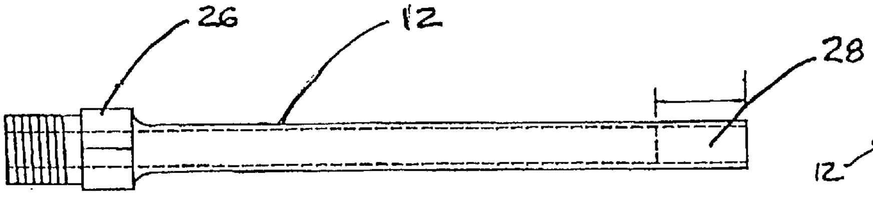
FIG. 6 illustrates a side view of the fusible plug.

FIG. 6 illustrates a side view of the fusible plug. In basic construction, the fusible plug 12 comprises an elongated cylindrical metal tube 12 (preferably brass because it is corrosion resistant and is compatible and provides a strong seal with the solder plug), a hexagonal wrench fitting 26, and a threaded end (5⁄16's National Fine Thread) at one end, which enable the fusible plug 12 to be connected to a gas line 10 (not shown). At the opposite end, in the interior thereof, the fusible plug 12 includes a solder plug 28 which is engineered to melt at a specified temperature, for example, 165° F. The elongated thin tubular configuration of the fusible plug 12, with the solder plug 28 at the exposed end, makes it highly sensitive to elevated temperatures, such as those created by a fire. The thin elongated tube 16 does not conduct heat readily and consequently the sensed heat is focussed on the solder plug 28, to make it highly sensitive. When installed, the solder plug should be located below ceiling level so it is sensitive to hot air currents on the underside of the ceiling.

Figure 7:
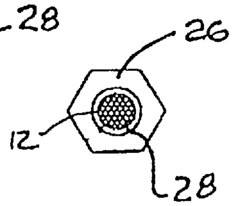
FIG. 7 illustrates an end view of the fusible plug.

FIG. 7 illustrates an end view of the cylindrical tubular fusible plug 12, the hexagonal wrench fitting 26, and the solder plug 28. When a fire occurs, and the temperature exceeds the melting temperature of the solder plug 28, the plug 28 melts and gas is released from the system, including the cylinders 8. The raised door 1 then drops into a closed position. A fusible plug constructed of thin brass tubing and solder at one end and has been pressure tested up to over 3,000 psi without leaking.

Figure 8:
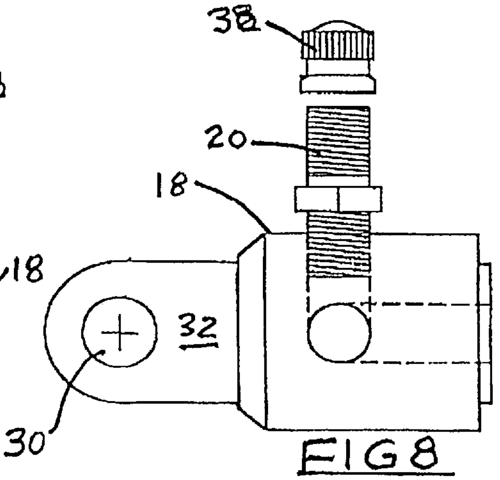
FIG. 8 illustrates a front view of the cylinder manifold.

FIG. 8 illustrates a front view of the specially designed cylinder manifold. The cylinder manifold 18 is specifically engineered to fit with the base of the nitrogen cylinder 8 and enable the cylinder 8 to be pivotally connected to the bracket 14. The cylinder manifold is not available in the marketplace. As seen in FIG. 8, the cylinder manifold 18 is generally of cylindrical construction, but includes at one end an extension 32, with a bolt hole 30 formed therein. On one side of the body of the cylinder manifold, an aircraft needle valve 20 is threadedly engaged into a hole formed in the side of the cylinder manifold 18. To ensure proper operation of the aircraft needle valve 20, and prevent clogging, it is capped with a cap 38. The bleed connector 22 is fitted into another hole formed in the cylinder manifold 28 and enables gas pressure in the gas lines 10 and the cylinder 8 to be relieved by bleeding, or alternatively, to be pressurized. This is done by introducing gas into the system through the bleed connector 22. The overall gas pressure in the system (preferably nitrogen, but it can be any inert gas) can be customized to suit each application. When more than one cylinder manifold 18 is used, there is a need for only one bleed connector, since the entire gas system is interconnected and can be pressured through one bleed connector 22.

Figure 10:
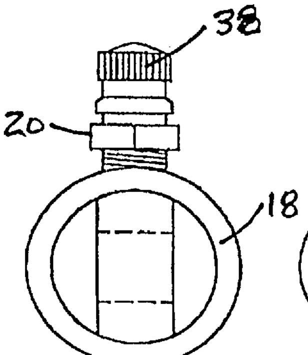
FIG. 10 illustrates a left side view of the cylinder manifold.
Figure 11:
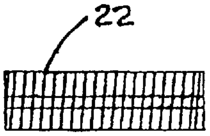
FIG. 11 illustrates a side detail view of the bleed connector.
Figure 9:
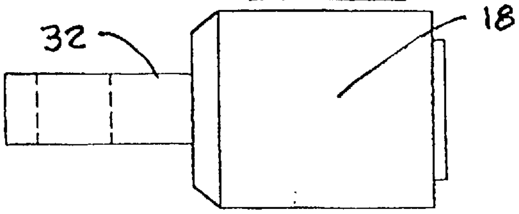
FIG. 9 illustrates a bottom view of the cylinder manifold.
Figure 12:
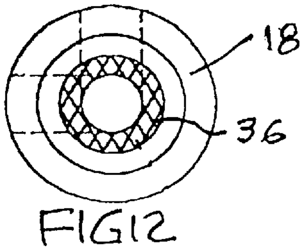
FIG. 12 illustrates a right side view of the cylinder manifold.

FIG. 9 illustrates a bottom view of the cylinder manifold 18 with the extension 32. FIG. 10 illustrates a left side view of the cylinder manifold 18 with the needles valve 20 and cap 38. FIG. 11 illustrates a side detail view of the bleed connector 22 with threads. FIG. 12 illustrates a right side view of the cylinder manifold 18. FIG. 12, in particular, illustrates the O-ring 36, which ensures that the cylinder manifold 18 engages in gas-tight manner with the base of the cylinder 8, and prevents gas leakage.

Figure 13:
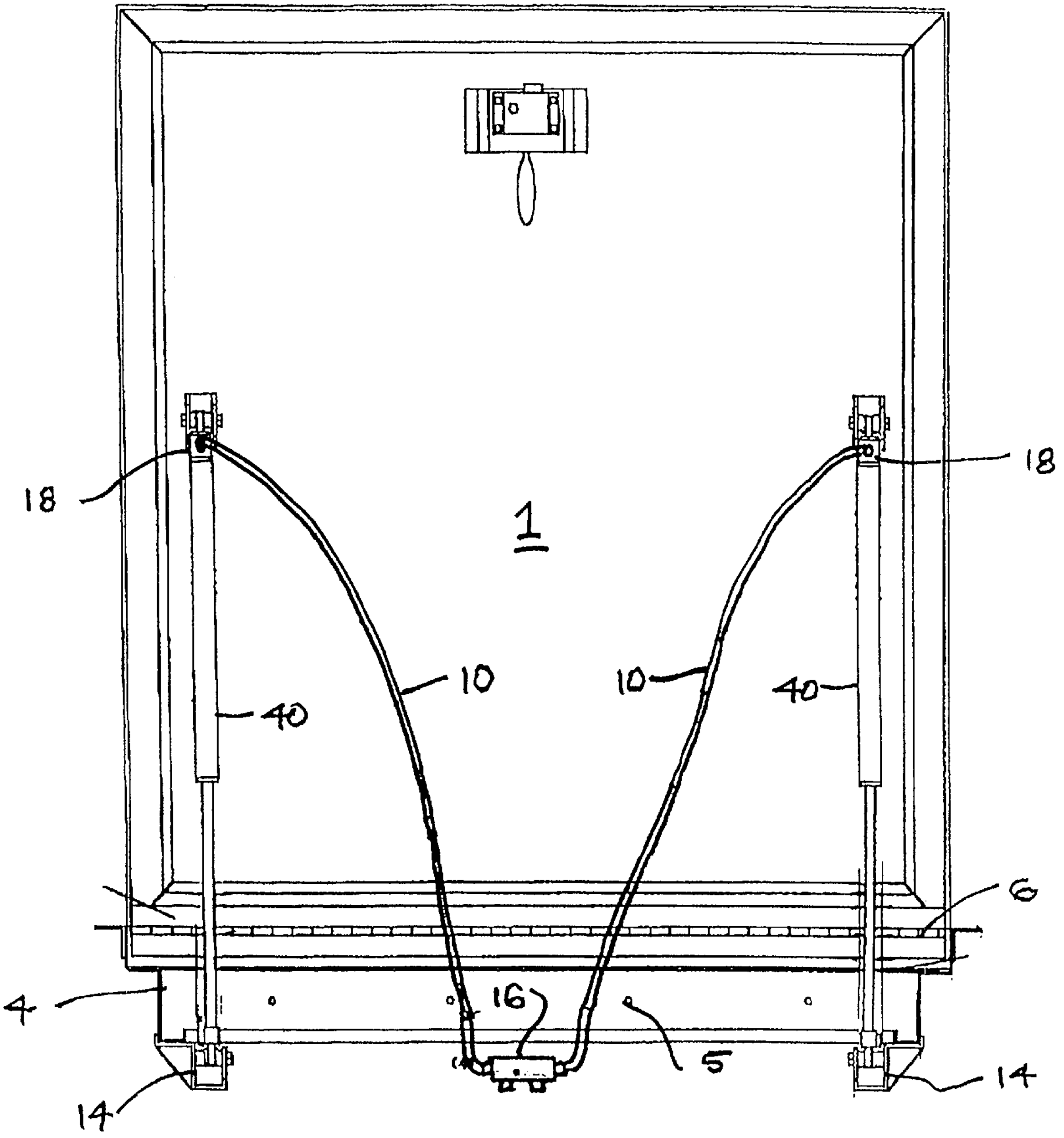
FIG. 13 illustrates a front view of a floor door with the cylinders inverted.

FIG. 13 is a front view of an alternative embodiment of the floor door wherein the two gas cylinders 40 are inverted, compared to the cylinders 8 shown in FIGS. 1, 2, 4 and 5. Since the two gas manifolds 18 are pivotally mounted on the floor door 1, gas lines 10 also extend to the door 1 to connect to the two manifolds. Otherwise, everything else is the same.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A self-closing fire rated floor door assembly comprising:

(a) a fire rated frame with an opening therethrough;

(b) a fire rated door hingedly connected to the frame and cooperating with the opening;

(c) a cylinder with a fluid opening, the cylinder being pivotally connected to the frame and the door, the cylinder when pressurized with a fluid through the fluid opening maintaining the door in an open position relative to the frame, and when the fluid escapes from the fluid opening, enabling the door to close relative to the frame;

(d) a fusible plug, rated according to a specific temperature, connected in fluid-tight manner with the fluid opening, the fusible plug when subjected to the specific temperature melting and enabling the fluid to escape from the fluid opening in the cylinder and the door to close.

2. An assembly as claimed in claim 1 including a pair of cylinders, which are gas cylinders, the first gas cylinder being located on one side of the frame and the second gas cylinder being located on an opposite side of the frame.

3. An assembly as claimed in claim 2 wherein the pair of gas cylinders are connected to the fusible plug by a gas line.

4. An assembly as claimed in claim 3 including a second fusible plug connected to a pair of gas cylinders, the first fusible plug being located at one side of the frame, and the second fusible plug being located at an opposite side of the frame.

5. An assembly as claimed in claim 4 wherein the pair of fusible plugs are connected to the pair of gas cylinders by a series of gas-tight tubes, and a gas distribution manifold.

6. An assembly as claimed in claim 1 wherein the fusible plug is constructed of a hollow, elongated, thin wall tube, with a gas fitting at one end adapted to engage with a gas tube, and a solder plug located in the interior of the tube at the end opposite the gas fitting, the solder being engineered to melt at a specified temperature.

7. An assembly as claimed in claim 1 wherein the fluid opening of the cylinder is connected to a cylinder manifold which is pivotally mounted in a bracket secured to the frame, the cylinder manifold having formed therein a first opening which receives an aircraft needle valve and a second opening which receives a bleed connector valve.

8. An assembly as claimed in claim 3 wherein the fluid opening of the cylinder is connected to a cylinder manifold which is pivotally mounted in a bracket secured to the frame, the cylinder manifold having formed therein a first opening which receives an aircraft needle valve and a second opening which receives a bleed connector valve.

9. An assembly as claimed in claim 7 wherein the cylinder manifold has an O-ring in the interior thereof, and at one end an extension for receiving a bolt which connects pivotally to a bracket secured to the frame.

10. An assembly as claimed in claim 1 wherein the fluid opening of the cylinder is connected to a cylinder manifold which is pivotally mounted in a bracket secured to the door, the cylinder manifold having formed therein a first opening which receives an aircraft needle valve and a second opening which receives a bleed connector valve.

11. An assembly as claimed in claim 1 including four cylinders and four fusible plugs.

* * * * *